United States Patent [19]
Zipay

[11] 3,924,575
[45] Dec. 9, 1975

[54] FLUID HEATING AND SEPARATING APPARATUS

[75] Inventor: Albert John Zipay, Clifton, N.J.

[73] Assignee: Foster Wheeler Energy Corporation, Livingston, N.J.

[22] Filed: Nov. 20, 1974

[21] Appl. No.: 525,429

[52] U.S. Cl. .................... 122/34; 165/113; 55/337; 122/491
[51] Int. Cl.² .......................................... F22B 1/02
[58] Field of Search ............... 122/32, 34, 488, 491; 165/113, 114; 55/337, 343, 267, 268, 269

[56] References Cited
UNITED STATES PATENTS

| | | | |
|---|---|---|---|
| 2,381,006 | 8/1945 | Scott, Jr. | 165/114 X |
| 2,756,028 | 7/1956 | Byerly | 165/113 X |
| 2,812,164 | 11/1957 | Thompson | 165/114 X |
| 3,183,896 | 5/1965 | Lytle et al. | 122/406 |
| 3,296,779 | 1/1967 | Daman et al. | 55/337 |
| 3,314,220 | 4/1967 | Goldstein | 55/343 |

*Primary Examiner*—Kenneth W. Sprague
*Attorney, Agent, or Firm*—John E. Wilson; Marvin A. Naigur

[57] ABSTRACT

A fluid heating and separating apparatus in which an upper separating chamber and a lower heating chamber are defined in a pressure vessel, and a relatively hot fluid is introduced into the heating chamber. A relatively cool fluid is passed through the heating chamber in a heat exchange relationship with the relatively hot fluid to heat the cool fluid and condense at least a portion of the hot fluid. The chambers are in communication to permit the passage of the light portions of the hot fluid from the heating chamber into the separating chamber in which it is separated into a vapor portion which is passed outwardly from the vessel, and a liquid portion which is passed back into the heating chamber.

7 Claims, 2 Drawing Figures

U.S. Patent  Dec. 9, 1975  3,924,575
FIG.I.
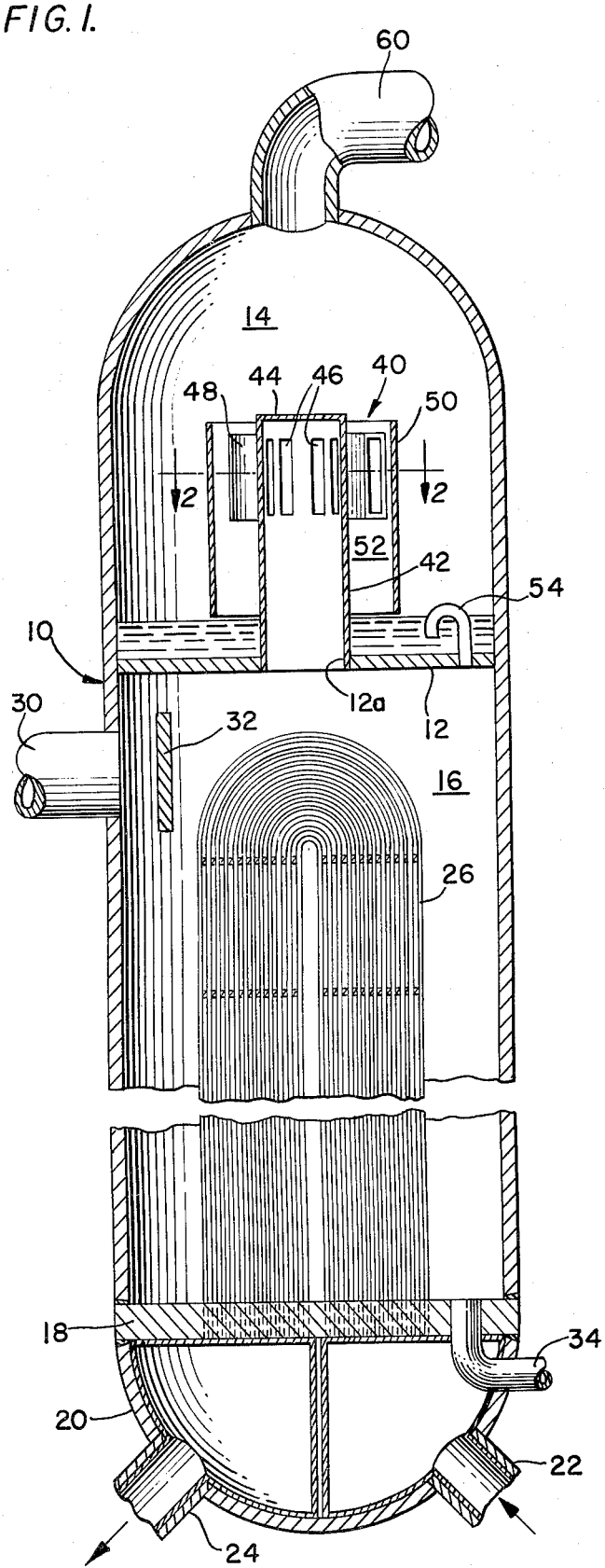
FIG.2.
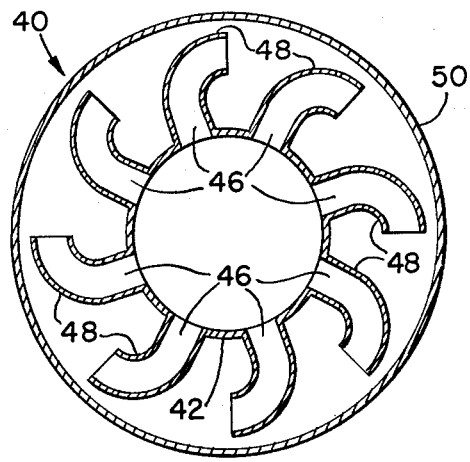

FLUID HEATING AND SEPARATING APPARATUS

BACKGROUND OF THE INVENTION

This invention relates to a fluid heating and separating apparatus, and more particularly, to such an apparatus in which a hot fluid is used to heat a cool fluid and in which vapor is separated out of the hot fluid and passed to an external source.

In a once-through subcritical or supercritical steam generating system, it is desirable to have a separator for separating a two-phase, relatively hot, fluid into its base components for and during start-up of the generator. This separation is especially advantageous since the vapor can be passed to turbine gland seals and to a superheater for early rolling and synchronizing of the turbine, while the liquid or relatively cool fluid can be circulated back to the generator through a deaerator and other type circuits. Also in systems of this type, the hot fluid is often passed in a heat exchange relation to feedwater to heat the latter before passing same to other stages of the system.

Traditionally, a flash tank or separator has been utilized to perform the separating function while a separate heat exchanger has been utilized to effect a heat exchange between the relatively hot fluid and the feedwater. However, it can be appreciated that to employ two separate units for the two functions is relatively costly and requires a substantial investment in two high pressure vessels and associated equipment.

U.S. Pat. No. 3,183,896, issued May 18, 1965, and assigned to the same assignee as the present invention, discloses the use of an arrangement in which both the heat exchange function and the separating function can be carried out in the same vessel. The vessel is in the form of a single upright cylindrical pressure vessel separated into an upper chamber for performing the separating function and a lower chamber for performing the heat exchange function. In this arrangement, the two-phase fluid is passed into the upper separating chamber in which an initial separation process is performed, with the resulting steam either passing downwardly into the heat exchange portion of the vessel or upwardly into a separator unit in which a final separation process is performed. The disclosure of this patent is hereby incorporated by reference.

Although this arrangement has proven very satisfactory it has required the use of a relatively large vessel, especially due to the fact that the mixture of fluid is initially separated in the separating chamber before the relatively hot fluid is either passed to the heating chamber or to the separator unit. Of course, the relatively large vessel is disadvantageous from both a space and cost standpoint.

SUMMARY OF THE INVENTION

The present invention is designed to overcome the disadvantages noted above and yet provide a single vessel which performs both a separating and heat exchange function.

More particularly, the fluid heating and separating apparatus of the present invention enables both of the heating and separating functions to be performed in a single vessel, yet enables a vessel of a relatively small size to be utilized.

To this end, the fluid heating and separating apparatus of the present invention comprises a pressure vessel, means defining an upper separating chamber and a lower heating chamber in the vessel, an inlet in the vessel communicating with the heating chamber for introducing a relatively hot fluid into the heating chamber, means in the heating chamber for passing a second, relatively cool fluid from an external source in a heat exchange relation with the hot fluid to heat the cool fluid and condense at least a portion of the hot fluid, means connecting the chambers to permit the passage of a portion of the hot fluid from the heating chamber into the separating chamber, and means in the separating chamber for separating the vapor portion of the hot fluid from the liquid portion thereof.

BRIEF DESCRIPTION OF THE DRAWINGS

FIG. 1 is a vertical cross-sectional view of the heating and separating apparatus of the present invention; and FIG. 2 is an enlarged, cross-sectional view taken along the line 2—2 of FIG. 1.

DESCRIPTION OF THE PREFERRED EMBODIMENTS

The fluid heating and separating apparatus is shown in FIG. 1 and consists of a upright cylindrical pressure vessel shown in general by the reference numeral 10, which is separated by a horizontal partition 12 into an upper chamber 14 and a lower chamber 16.

A tube sheet 18 is disposed at the lower portion of the vessel 10 and supports a partitioned fluid header 20 having an inlet 22 and an outlet 24 for respectively receiving and discharging a relatively cool fluid, such as feedwater. A bundle of generally U-shaped tubes 26 are disposed in the heating chamber 16 with their end portions connected to the tube sheet in a manner so that water from the inlet 22 passes into the header 20 and through the tubes 26 before exiting through the outlet 24.

An inlet 30 is provided through the vessel 10 which communicates with the upper portion of the heating chamber 16 for introducing a relatively hot, two-phase fluid, i.e. a mixture of liquid and vapor, into the heating chamber 16. An impingement baffle 32 is disposed in the chamber 16 in the path of the fluid from the inlet 32 for preventing the liquid portion of the fluid from directly contacting the tubes 26 and possibly damaging same.

In the chamber 16, most of the relatively heavy portions of the fluid entering the chamber will fall to the lower portion of the chamber under the force of gravity and thus heat the feedwater passing through the tubes. The liquid portion of this relatively hot fluid, as well as the vapor portion that is condensed by virtue of the heat exchange with the feedwater in the tube 26, will collect on the upper surface of the tube sheet 18 where it can pass outwardly from the vessel 10, via an outlet conduit 34, to another stage of the system such as a high pressure heater, or the like. The heated feedwater passing from the tubes 26 and through the outlet 24 is also passed to another stage of the system, such as an economizer section of the vapor generator.

The relatively light portion of the fluid entering the chamber 16 through the inlet 30 will rise upwardly in the chamber by virtue of its bouyancy and the lower pressure in upper chamber 14 where it passes through a central opening 12a formed through the partition 12 and enters a separator, shown in general by the reference numeral 40.

The separator 40 includes a tubular collection member 42 extending upwardly from the partition 12 and registering with the opening 12a. An end plate 44 is disposed over the top end portion of the collection member 42, and a plurality of slots 46 are formed through the upper wall portion of the collection member. As better shown in FIG. 2, a plurality of substantially arcuate-shaped conduits, or nozzles, 48 are connected to the collection member 42 in registery with the slots 46. The separator 40 also includes a cylindrical baffle 50 which extends around a portion of the collection member 42 in a coaxial relationship therewith, with the inner wall of the baffle being spaced a small distance from the free end portions of the nozzles 48. Although not clear from the drawings, it is understood that the baffle 50 is supported relative to the collection member 42 in the position shown in a conventional manner, and that the upper and lower ends of the baffle are either completely open or have a plurality of openings extending therethrough.

As a result, the relatively light fluid passing upwardly from the chamber 16 and into the collection member 42 will pass radially outwardly from the latter member through the slots 46 and into the nozzles 48 where it will be directed tangentially against the inner wall of the baffle 50. This creates a vortex, or whirling stream, of fluid with the resulting centrifugal forces causing the vapor portion of the fluid to travel away from the inner wall of the baffle 50 and toward the center of the whirling stream and pass upwardly, by virtue of its buoyancy, into the upper portion of the chamber 14 from which it exits, via the outlet 60, to another stage of the system.

The liquid portion of the fluid in the whirling stream collects on, and flows down, the inner wall of the baffle 50 until it falls off the wall and collects on the upper surface of the partition 12. An outlet tube 54 registers with an opening in the partition 12 for permitting the liquid collected in the chamber 14 to pass to the chamber 16 where it exits through the outlet 34. The tube 54 has a curved end portion terminating a predetermined distance above the partition 12 to permit the liquid collecting on the upper surface of the partition 12 to be maintained at a level necessary to provide a water seal between chambers 14 and 16.

It is understood that the specific construction of the separator 40 is not a part of the present invention and can vary from that discussed above. For example, the separator may be of the type disclosed in U.S. Pat. No. 3,296,779, the disclosure of which is hereby incorporated by reference.

It is thus seen that, according to the present invention, since the liquid-vapor mixture is introduced into the lower chamber 16, rendering a portion of the vapor contained therein susceptible to condensation by virtue of passage over the tubes 26, a relatively low amount of vapor will pass upwardly into the collection member 42 for separation in the separator 40. Therefore, the upper separating chamber 14 and the separator 40 may be of a much smaller size than in previous arrangements, thus considerably adding to the efficiency of the system and reducing the costs.

The fluid heating and separating apparatus of the present invention is designed to be incorporated in a power plant, including a steam generator and a steam turbine of the type disclosed in the above-mentioned U.S. Pat. No. 3,183,896. Toward this end, a by-pass conduit system would connect the outlet of a primary superheater or platen-superheater directly to the inlet 30 of the vessel 10, via suitable valving, for the purpose of by-passing the turbine during start-up since the turbine is incapable of handling the relatively cool fluid. As a result, during the early stages of start-up, the fluid, which would be substantially liquid, would enter the chamber 16 through the inlet 30 and would pass through the latter chamber and the outlet 34 to a high pressure heater, a deaerator storage tank, or the like. After the burners of the furnace section of the vapor generator have been ignited and the firing rate increased, the temperature of the fluid entering the chamber 16 would increase and its heat would be transferred to the feedwater passing through the tubes 26. Since, at this stage, the operating pressure in the chamber 16 is relatively low due to the condensation of the relatively hot fluid by the incoming cold feedwater passing through the tubes 26, a good portion of the vapor entering through the inlet 30 is condensed in the chamber 16. As the condensing capacity of the tubes 26 approach their upper limit, the pressure in chamber 16 tends to increase, causing a greater portion of fluid in the chamber 16 to pass upwardly into the chamber 14 for further separation in the separator 40, as discussed above.

The vapor separated in the chamber 14 by the separator 40 will pass upwardly through the outlet 60 and may be directed, through proper valving, to different units in the system designed to make use of the steam at this time, including a deaerator, the turbine gland seals, etc. Also, some steam from the outlet 60 can be fed directly to the turbine for warming, rolling and initially loading it.

As the turbine reaches full capacity, the valving is changed to direct very little, if any, of the fluid into the inlet 30 of the vessel 10. However, the feedwater passing through the tubes 26 can still be heated by passing superheated steam from an intermediate pressure turbine and directing it into a separate inlet (not shown) to the chamber 16 where is would pass across the tubes 26 in a heat exchange relation with the feedwater, as discussed above.

It is thus seen that, by virtue of the relatively hot fluid entering the chamber 16 where a high percentage of the steam portion of the fluid is condensed, the capacity of the separating chamber 14 and the separator unit 40 in the chamber does not have to be as high when compared to systems in which the hot fluid initially enters the separating chamber of the vessel, as discussed above. As a result, a more efficient system is possible, making it possible to use smaller equipment at a savings of space and cost.

Of course, other variations of the specific construction and arrangement of the apparatus disclosed above can be made by those skilled in the art without departing from the invention as defined in the appended claims.

What is claimed is:

1. A fluid heating and separating apparatus comprising a pressure vessel, means defining an upper separating chamber and a lower heating chamber in said vessel, an inlet communicating with the upper portion of said heating chamber for introducing a relatively hot fluid into said heating chamber, a plurality of tubes in said heating chamber, means for passing a relatively cool fluid from an external source through said tubes, the relatively heavy portion of said hot fluid passing downwardly in said heating chamber across said tubes in a heat exchange relation with said cool fluid to heat said cool fluid, means connecting said chambers to permit the passage of the relative light portion of said hot fluid from said heating chamber into said separating chamber, and means in said separating chamber for separating the vapor portion of said relatively light portion of hot fluid from the liquid portion thereof.

2. The apparatus of claim 1 wherein said separating means comprises means for subjecting said relatively light portion of said hot fluid to a centrifugal action.

3. The apparatus of claim 1 further comprising means for passing said liquid portion from said separating chamber back to said heating chamber.

4. The apparatus of claim 1 further comprising outlet means in said separating chamber for permitting the passage of said vapor portion to an external source.

5. The apparatus of claim 1 further comprising an impingement baffle located in the path of said hot fluid entering said heating chamber through said inlet for preventing said hot fluid from directly impinging upon said tubes.

6. The apparatus of claim 1 further comprising outlet means in said heating chamber for permitting the passage of said relatively heavy portion of said hot fluid to an external source.

7. The apparatus of claim 1 wherein said relative light portion of said hot fluid passes from said heating chamber into said separating chamber by virtue of its buoyancy and the lower pressure in said separating chamber.

* * * * *